United States Patent Office 3,228,992
Patented Jan. 11, 1966

3,228,992
DEHYDROGENATION OF CYCLOHEXANES
John W. Myers, Bartlesville, Okla., assignor to Phillips Petroleum Company, a corporation of Delaware
No Drawing. Filed Apr. 9, 1962, Ser. No. 185,858
3 Claims. (Cl. 260—666)

This invention relates to dehydrogenation of cyclohexanes. In one of its aspects, it relates to the dehydrogenation of a cyclohexane to a cyclohexene in the presence of a catalyst consisting essentially of an oxide of at least one of the following metals: chromium, molybdenum, vanadium and tungsten, supported on a non-acidic base, the efficiency of the conversion being increased by conducting the reaction in the presence of steam. In another of its aspects, the invention provides a method for the dehydrogenation of cyclohexane to cyclohexene over a catalyst as described supported on a non-acidic base such alumina, silica, magnesia, and the like.

It has been found that the efficiency of conversion of cyclohexane to cyclohexene upon a catalyst as herein described is considerably increased by presence of steam.

An object of this invention is to provide a method for the dehydrogenation of a cyclohexane to a cyclohexene. It is a further object of this invention to increase the efficiency of a method of converting a cyclohexane to a cyclohexene in the presence of a metal oxide containing catalyst. It is a further object of this invention to dehydrogenate a cyclohexane employing a catalyst consisting essentially of an oxide of chromium, molybdenum, vanadium and tungsten supported on a non-acidic base.

Other aspects, objects and the several advantages of the invention are apparent from a study of this disclosure and the appended claims.

According to the present invention, there is provided a method for the dehydrogenation of a cyclohexane upon a catalyst as herein described, the efficiency of the conversion being increased by conducting the reaction in the presence of steam.

The invention contemplates the hydrocarbons which include alkyl cyclohexanes containing 1–5 carbon atoms in the alkyl substituents.

The invention is exemplified by reference to data in the tables given below.

The catalysts which are employed in the present invention are known in the prior art. Both impregnated and precipitated catalysts can be utilized. The catalytic oxides described are used in conjunction with a non-acidic base, according to the invention. These bases can be selected from those mentioned and others having similar properties. The essence of the invention is found in the use of steam with such catalysts as herein described.

The acidic bases such as silica-alumina, silica-magnesia, alumina-boria, and the like have a tendency to catalyze benzene formation in cracking reactions and are, therefore, not desirable in this process. The catalytic oxides which are used will usually comprise about 2–50 weight percent, preferably 5–30 weight precent of the total catalyst.

Process conditions are correlated to effect from about 5 to about 25 percent conversion of the cyclohexane feed, this range being about the best to obtain optimum conversion to cyclohexene. The conditions of operation are chosen within the following ranges:

| | Broad | Preferred |
|---|---|---|
| Temperature, °F | 900–1,200 | 1,000–1,150 |
| Pressure, atm | 0.5–5 | 1–3 |
| Steam/hydrocarbon, mol ratio | 0.1–20 | 0.5–20 |
| LHSV of hydrocarbon | 0.1–10 | 0.2–5 |

As the variables are interrelated in their effect on conversion, they are chosen within these ranges to effect a conversion per pass of cyclohexane within the range of 5 to 25 percent.

Conventional apparatus can be used for this process.

The following tests show the effectiveness and advantages of including steam in the reaction zone.

The examples were all carried out in a stainless steel reaction tube heated in an insulated electric furnace.

Example I

The tests in this example were carried out using an impregnated chromia-alumina catalyst containing about 20 weight percent chromia impregnated to a controlled depth on alumina pills. This catalyst is used commercially for dehydrogenation, and is known as Phillips C-1B.

TABLE I

| | 1 | 2 | 3 | 4 | 5 | 6 |
|---|---|---|---|---|---|---|
| Catalyst | C-1B | C-1B | C-1B | C-1B | C-1B | C-1B |
| Temperature, °F | 878 | 832 | 774 | 1,024 | 1,021 | 1,027 |
| Pressure, p.s.i.g | 0 | 0 | 0 | 0 | 0 | 0 |
| LHSV | 1.0 | 1.1 | 1.1 | 0.5 | 1.0 | 0.2 |
| Steam/HC, mol ratio | 0.0 | 0.0 | 0.0 | 5.3 | 1.1 | 5.0 |
| Length of Test, Hours | 2 | 1 | 1 | 2 | 2 | 1.8 |
| Conversion, percent | 68.8 | 19.1 | 7.5 | 13.3 | 15.9 | 21.8 |
| Cyclohexene in product, wt. percent | 0.3 | 1.9 | 1.4 | 4.0 | 4.4 | 4.3 |
| Benzene in product, wt. percent | 63.4 | 15.5 | 4.6 | 4.6 | 7.2 | 8.4 |
| Selectivity to Cyclohexene, wt. percent | 0.5 | 10.0 | 18.7 | 30.1 | 27.6 | 19.7 |

These tests show that the presence of steam in the feed (Tests 4, 5 and 6) increases the efficiency of conversion to cyclohexene compared to tests made without steam (Tests 1, 2 and 3). Tests 3 in particular shows that even at low conversion, the lack of steam leads to much lower efficiency than at considerably higher conversion with steam present (Test 4).

Example II

The data in the table below show a test with a commercial 90–10 vanadium oxide-alumina in which (believed to be produced by impregnation) results are satisfactory by use of the process of the present invention. The test using silica-alumina even at very low conversion in a conventional operation produces very low efficiency conversion. The silica-alumina was a commercial (Houdry) 87 percent silica–13 percent alumina catalyst.

TABLE II

| | 7 | 8 |
|---|---|---|
| Catalyst | R-46 10 V$_2$O$_5$ 90 Al$_2$O$_3$ | R-471 Silica-Alumina |
| Temperature, °F | 1,100 | 1,048 |
| Pressure, p.s.i.g | 0 | 0 |
| LHSV | 1.5 | 4.7 |
| Steam/HC, mol ratio | 1.0 | 0.0 |
| Length of test, hours | 2 | 0.5 |
| Conversion, percent | 14.5 | 4.7 |
| Cyclohexene in product, wt. percent | 5.0 | 0.3 |
| Benzene in product, wt. percent | 5.2 | 1.7 |
| Select to cyclohexene, wt. percent | 34.5 | 6.4 |

Reasonable variation and modification are possible within the scope of the foregoing disclosure and appended claims to the invention the essence of which is that the dehydrogenation of a cyclohexane to a cyclohexene over an oxide of chromium, molybdenum, vanadium and/or tungsten supported on a non-acidic base, such as alumina, silica, magnesium, or the like, is improved by conducting a dehydrogenation in the presence of steam.

I claim:

1. A process for the dehydrogenation to a cyclohexene of a cyclohexane selected from the group consisting of cyclohexane and an alkyl cyclohexane containing 1-5 carbon atoms in the alkyl over a catalyst consisting essentially of an oxide selected from the group consisting of oxides of chromium, molybdenum, vanadium, and tungsten supported on a non-acidic base selected from the group consisting of alumina, magnesia and silica, the amount of the oxide being in the range 2–0 percent by weight of the total catalyst, and the process being characterized in that it is conducted in the presence of steam at a temperature in the range 900–1200° F., employing a steam to hydrocarbon mol ratio in the range .5–20.

2. A process for the dehydrogenation of cyclohexane to cyclohexene in the presence of an impregnated chromia-alumina catalyst consisting essentially of about 5–30 weight percent chromia impregnated upon alumina characterized in that the process is effected in the presence of steam at a temperature in the range 900–1200° F., employing a steam to hydrocarbon mol ratio in the range .5–20, the conversion conditions being selected to effect a conversion in the approximate range 5–25 percent of the feed per pass.

3. A process for the dehydrogenation of cyclohexane to cyclohexene in the presence of an impregnated vanadia-alumina material consisting essentially of about 5–30 weight percent vanadia impregnated upon alumina characterized in that the process is effected in the presence of steam at a temperature in the range 900–1200° F., employing steam to hydrocarbon mol ratio in the range of .5–20, the conversion condition being selected to effect a conversion in the approximate range 5–25 percent of the feed per pass.

References Cited by the Examiner

UNITED STATES PATENTS

| | | | |
|---|---|---|---|
| 2,754,345 | 7/1956 | Kirschenbaum | 260—666 X |
| 2,902,522 | 9/1959 | Owen | 260—666 X |

DELBERT E. GANTZ, *Primary Examiner.*

ALPHONSO D. SULLIVAN, *Examiner.*